United States Patent Office 2,745,866
Patented May 15, 1956

2,745,866
α,β-DIARYL SUBSTITUTION PRODUCTS OF
α-ALKENONITRILES

Kurt J. Rorig, Evanston, Ill., assignor, by mesne assignments, to G. D. Searle & Co., Skokie, Ill., a corporation of Delaware No Drawing. Application January 22, 1953,
Serial No. 332,757

1 Claim. (Cl. 260—465)

The present invention relates to new chemical compounds and to methods for their production and particularly to a α,β-diaryl substitution products of α-alkenonitriles. The nitriles of my invention can be represented by the general structural formula

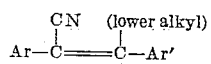

in which Ar and Ar' represent aromatic groups, preferably containing 6 to 12 carbon atoms and belonging to the phenyl or naphthyl series, i. e., containing no more than two isocarbocyclic rings.

Typical examples are phenyl, naphthyl, alkylated derivatives thereof such as o-, m-, and p-tolyl and xylyl, alkoxylated derivatives such as anisyl and methoxynaphthyl, nitro-substituted derivatives such as nitrophenyl and nitrotolyl, halogen substituted groups such as chlorophenyl and bromotolyl, and other substituted aryl groups such as methylmercaptophenyl and cyanotolyl. The radicals Ar and Ar' may be identical or different aromatic groups. The lower alkyl radical can be methyl, ethyl, allyl, vinyl and straight as well as branched chained propyl, butyl, pentyl, hexyl, heptyl and octyl groups.

The present invention is a continuation-in-part of my copending application Serial No. 162,603 filed May 17, 1950, now abandoned.

The compounds of my invention are valuable therapeutic agents particularly because of their hormonal effects. It has been found that while the claimed compounds of the foregoing structural formula have been shown to be active neoglycogenetic agents, compounds in which the lower alkyl group in β-position to the cyano radical is replaced by a hydrogen atom have proven to be inactive under strictly comparable conditions.

The claimed compounds are also valuable as intermediates in the synthesis of other medicinal agents. Thus hydrogenation, i. e., with hydrogen in the presence of palladium on charcoal under pressure yields alkanonitriles of the type

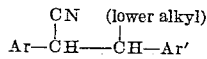

which are valuable anti-hypertensive agents. These alkanonitriles, on treatment with hydrobromic acid in glacial acetic acid, yield α,β-diarylalkanamides which are active anti-hypertensive agents.

When the α,β-diarylalkanonitriles are submitted to Grignard reaction, valuable ketones are obtaintd. Thus α,β - bis(p - methoxyphenyl)pentanonitrile reacts w i t h methyl magnesium bromide to form

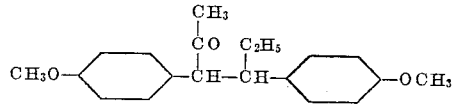

Such alkanones are active estrogens.

The preparation of the nitriles of my invention is accomplished by a method which can be represented schematically by the following reaction:

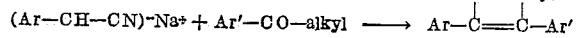

In the first reaction, the nitrile must be treated with at least one equivalent of a strong alkaline condensing agent such as sodamide or a sodium alkoxide. To the sodio derivative thus obtained there is then added fairly rapidly the aryl alkyl ketone and the mixture is heated at the reflux temperature of the solvent. It is essential in this reaction to use a relatively high boiling solvent. Anhydrous organic solvents boiling between 60–150° C. may be employed, and the best yields are obtained with solvents such as aromatic hydrocarbons boiling in the range between 110–150° C., such as toluene and xylene. The reaction may be completed within a time as short as 15 minutes.

The prior art discloses methods of condensing compounds such as benzyl cyanide with aromatic aldehydes, using catalytic amounts of such weak condensing agents as dilute sodium hydroxide, potassium hydroxide, ammonium hydroxide, piperidine, or combinations such as ammonium acetate and acetic acid. Such condensing agents fail in the case of aryl alkyl ketones. The new method disclosed in this invention may be distinguished from these aldehyde condensations in three important characteristics:

1. Strong condensing agents are necessary, such as sodamide or sodium alkoxides.
2. Higher temperatures are required.
3. At least one equivalent of alkali must be used.
4. The alkali metal derivative is prepared before the addition of the ketone. (In the case of the aldehydes, the nitrile, aldehyde and condensing agent are reacted all at once.)

Bodroux produced ethylenic nitriles of the type RR'C=CPhCN from the sodio derivative of benzyl cyanide with ketones of the type R—CO—R' (Bul. Soc. Chim. 9:758; 1911, and Comptes Rendus Acad. Sci. 152:1594; 1911), but he states that these reactions occur only when the groups R and R' are aromatic nuclei. He finds that double decomposition occurs when ketones of the type R—CO—CH₃, such as acetophenone, are made to react with the sodio derivative of benzyl cyanide, and that benzyl cyanide and the sodio derivative of the ketone of the formula R—CO—CH₂Na is formed. Bodroux's negative results are apparently due to his use of such low boiling solvents as ether. I have found that at low temperatures the sodio derivative is in fact destroyed without reacting and that if the conditions are made more extreme an aldol condensation occurs. Even when benzene is used as a solvent, yields are not very satisfactory and it is not until temperatures of 110° C. are reached, that the yields become excellent. The reaction is quite rapid at the higher temperature range, and competitive condensations of the aldol type do not interfere to a significant extent. As expected, both a cis- and a trans-isomer are obtained. The higher melting form contains the two aryl groups in trans-position.

My invention is disclosed in further detail by means of the following examples which are set forth for the purpose of illustrating the invention and which are in no way to be construed as limiting the invention in spirit or in scope. It will be apparent to chemists skilled in the art that many modifications in reagents and conditions can be adopted without departing from the intent or purpose of this invention. In the following examples, temperatures are given in degrees centigrade (° C.), relative amounts of materials in parts by weight and pressure during vacuum distillation in millimeters (mm.) of mercury.

EXAMPLE 1

α,β-Diphenyl-α-pentenonitrile

To a solution of 117 parts of benzyl cyanide in 350 parts of refluxing xylene are added 39 parts of sodamide over a period of 15 minutes or as rapidly as the exothermic reaction allows. The sodio derivative is a greenish-brown oil insoluble in xylene. To this sodio derivative of benzyl cyanide are added with stirring 134 parts of propiophenone at the reflux temperature of xylene over a period of 10 minutes. The reaction mixture turns deep red immediately upon addition of the ketone, and becomes pasty after a short time. It is refluxed for 30 minutes and then decomposed with water and treated with 60 parts of glacial acetic acid. The aqueous mixture is extracted several times with ether. The combined ether extracts are dried with anhydrous potassium carbonate and decolorized with activated charcoal. They are then distilled at about 135–180° C. at 1 mm. pressure. The crude distillate becomes semicrystalline on standing for several days. It is then slurried with 230 parts of low-boiling petroleum ether. This gives a solid melting at about 109–110° C. after recrystallization from glacial acetic acid. This isomer of α,β-diphenyl-α-pentenonitrile has the phenyl groups in trans-position. The petroleum ether filtrate from which the solid isomer has crystallized is evaporated and distilled to yield a liquid isomer which boils at about 117–119° C. at 0.1 mm. pressure. This distilled liquid probably still contains some of the solid isomer in solution. Both the purified solid and the purified liquid isomer give excellent analytical results. The pure cis-isomer is obtained by chromatography on alumina.

Using benzene as a reaction solvent the same two isomers are obtained but in poorer yield. When ether is used as solvent there apparently occurs an exchange, the sodium atom going from the benzyl cyanide to the propiophenone molecule. When the product of this reaction is worked up both starting materials are obtained unchanged, as observed by Bodroux (Bul. Soc. Chim. 9:758; 1911). The same pair of isomers can be prepared by still another method. 30 parts of sodium methoxide are dissolved in 160 parts of anhydrous methanol and 59 parts of benzyl cyanide are added. To the refluxing solution 67 parts of propiophenone are added and the solution is heated for an hour at reflux temperature. The product is decomposed and the isomers are isolated in the usual manner, but the yields are low. Better yields are obtained when using sodium methoxide powder in benzene.

20 parts of α,β-trans-diphenyl-α-pentenonitrile are dissolved in 200 parts of concentrated sulfuric acid and heated to 90° C. This solution after cooling to 55° C. in the next 5 minutes is poured into 1500 parts of water. The initially formed orange oil crystallizes on standing. It is then filtered, washed and recrystallized rapidly from 75% aqueous acetic acid. The orange 3-ethyl-2-phenyl-indone thus formed melts at about 97.0 to 98.1° C.

EXAMPLE 2

α-Phenyl-β-(p-anisyl)-α-pentenonitrile

The sodio derivative of benzyl cyanide is prepared from 19.5 parts of sodamide and 58.5 parts of benzyl cyanide in 300 parts of boiling xylene. To the refluxing mixture 82 parts of p-methoxypropiophenone are added in the course of 5 minutes. The mixture turns deep red and becomes pasty. Refluxing is continued for 30 minutes after which one decomposes with 300 parts of water and 30 parts of glacial acetic acid. The aqueous mixture is extracted repeatedly with ether. The combined ether extracts are dried over potassium carbonate, filtered and evaporated. The solid residue is triturated with petroleum ether and the α-phenyl-β-(p-anisyl)-α-pentenonitrile is obtained in the trans-form as a solid, which melts at about 104.5–105.5° C. after recrystallization from glacial acetic acid. The petroleum ether filtrate from which the solid isomer has crystallized is evaporated and distilled to obtain the cis-isomer which boils at about 138–143° C. at 0.2 mm. pressure.

EXAMPLE 3

α-Phenyl-β-(p-hydroxyphenyl)-α-pentenonitrile 50 parts of α-phenyl-β-(p-anisyl)-α-pentenonitrile are refluxed for 18 hours in a solution of 380 parts of glacial acetic acid and 283 parts of 48% hydrobromic acid. The dark brown reaction mixture, after dilution with 4000 parts of water, is extracted with ether. The oil remaining after evaporation of the dried ether extract is taken up in a minimum of warm benzene, treated with activated charcoal and cooled to yield the α-phenyl-β-(p-hydroxyphenyl)-α-pentenonitrile in brown crystals. These are dissolved in 1000 parts of 1% sodium hydroxide solution, decolorized with charcoal, and reprecipitated to yield pure white crystals melting at about 172–173° C.

EXAMPLE 4

α,β-Di-(p-anisyl)-α-pentenonitrile

The sodio derivative of homoanisonitrile is prepared by adding 20 parts of sodamide to a refluxing solution of 75 parts of homoanisonitrile in 300 parts of anhydrous toluene. To the refluxing mixture are added 84 parts of p-methoxypropiophenone. The reaction mixture turns dark brown and pasty as refluxing is continued for 30 minutes. Upon decomposition with water it turns yellow. 30 parts of glacial acetic acid are added and the mixture is extracted twice with ether. The ether extract is dried over potassium carbonate, filtered and the solvent is removed in vacuo. The brown solid is slurried with petroleum ether and a solid isomer of α,β-di-(p-anisyl)-α-pentenonitrile collected on the filter. Upon recrystallization from glacial acetic acid this trans-isomer melts at about 131.5–132.5° C. The petroleum ether filtrate yields on evaporation and distillation the liquid cis-isomer which boils at about 160–166° C. at 0.05 mm. pressure.

EXAMPLE 5

α-(p-Chlorophenyl)-β-phenylcrotononitrile

The sodio derivative of benzyl cyanide is prepared by the addition of 20 parts of sodamide to a refluxing solution of 59 parts of benzyl cyanide in 225 parts of xylene. To the refluxing mixture 77 parts of p-chloroacetophenone are added in the course of 5 minutes and heating at reflux temperature is continued for 30 minutes after which the mixture is decomposed with water and glacial acetic acid. After exhaustive ether extraction, the extracts are dried, filtered and evaporated. The residue is slurried with petroleum ether and the mixture filtered. A white solid trans-isomer is collected on the filter. The filtrate contains a mixture of the cis- and trans-isomers of α-(p-chlorophenyl)-β-phenyl-crotononitrile which distills at about 165–170° C. at 0.5 mm. pressure as a colorless liquid.

The infrared absorption spectrum shows maxima at 4.5 and 9.1 microns.

EXAMPLE 6

α-(p-Teritary-butyl-phenyl)-β-(6-methoxy-2-naphthyl)-crotononitrile

To a refluxing solution of 87 parts of p-(tert.-butyl)-benzyl cyanide in 330 parts of toluene 20 parts of sodamide are added as rapidly as the exothermic reaction permits. The mixture is maintained at reflux temperature as 100 parts of 6-methoxy-2-acetonaphthone are added in the course of 10 minutes and for an additional half hour. After cooling the mixture is decomposed with water and then acidified with sulfuric acid. The aqueous material is extracted several times with ether. The ether extracts are combined, dried over anhydrous potassium carbonate, stirred with activated charcoal and filtered. The filtrate is evaporated. A portion of the residue is insoluble in petroleum ether. The soluble fraction is again decolorized with charcoal and on evaporation a colorless mixture consisting apparently of the cis- and some of the trans-isomer of α-(p-tertiary-butyl-phenyl)-β-(6-methoxy-2-naphthyl)-crotononitrile is obtained. The infrared absorption spectrum shows a maximum at about 4.5 microns. Analysis confirms the composition as $C_{25}H_{25}NO$ corresponding to the structural formula

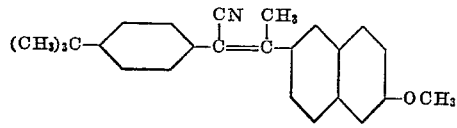

EXAMPLE 7

*α-(1-naphthyl)-β-(m-nitrophenyl)-α-isohexenonitrile*

The sodio derivative of 1-naphthylmethyl cyanide is prepared by adding 40 parts of sodamide to a boiling solution of 167 parts of 1-naphthylmethyl cyanide in 650 parts of xylene. 193 parts of m-nitroisobutyrophenone are then added in the course of 5–10 minutes and refluxing is continued with agitation for 30 minutes. After cooling the mixture is decomposed with water and acidified with glacial acetic acid. The aqueous material is extracted three times with a mixture of equal parts of toluene and ether. The combined extracts are dried over anhydrous potassium carbonate, stirred with charcoal and filtered. The solvent is removed in vacuo and the residue is extracted with petroleum ether. A portion of solid crystalline material remains insoluble. The soluble portion is again decolorized with charcoal and the petroleum ether is removed by distillation. There remains a colorless mixture of the cis- and trans-isomers of α-(1-naphthyl)-β-(m-nitrophenyl)-α-isohexenonitrile. This material is soluble in ether and only somewhat soluble in ethanol. The infrared absorption spectrum shows a maximum at about 4.49 microns. The analysis shows it to have the composition $C_{22}H_{18}NO_2$ which confirms the srtuctural formula

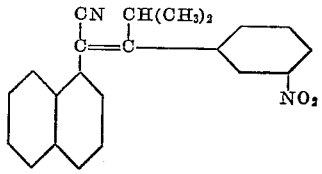

I claim:

An α,β-bis(p-anisyl)-α-pentenonitrile.

References Cited in the file of this patent
UNITED STATES PATENTS

| | | |
|---|---|---|
| 2,286,363 | Hechenbleikner | June 16, 1942 |
| 2,307,700 | Moore | Jan. 5, 1943 |
| 2,589,377 | Henecka | Mar. 18, 1952 |

OTHER REFERENCES

Bodroux: Bull. Soc. Chim. de France, vol. 9, p. 758 (1911).

Niederl et al.: J. Amer. Chem. Soc., vol. 64, pp. 885–6 (1942).